United States Patent Office 2,840,603
Patented June 24, 1958

2,840,603

VINYLPHENYL ALIPHATIC AMINOCARBOXYLIC ACIDS

Richard A. Mock and Leo R. Morris, Midland, Mich., assignors to The Dow Chemical Company, Midland, Mich., a corporation of Delaware No Drawing. Application October 12, 1956
Serial No. 615,509

14 Claims. (Cl. 260—518)

This invention concerns a new class of aliphatic aminocarboxylic acids having a novel combination and arrangement of chemically active functional groups. More particularly, it concerns new aliphatic aminocarboxylic acids having at least one amino group, at least one carboxyl group (at least one amino group and at least one carboxyl group being attached to the same aliphatic carbon atom or adjacent aliphatic carbon atoms), and having at least one vinylphenyl radical as substituent on the aminocarboxylic acid nucleus. The new compounds are useful per se as agents for chelation of metal ions and are further useful for the preparation of polymers that are useful chelation agents.

An object of this invention is to provide new chelation agents.

A more particular object is to provide new aminocarboxylic acids that are capable of chelating metal ions.

A still more particular object is to provide such aminocarboxylic acids that contain a vinylphenyl nucleus.

Another object is to provide a method for making such aminocarboxylic acids.

Further objects and advantages of the invention will be evident in the following description.

The objects of the invention have been attained in a new class of vinylphenyl aliphatic α- and β-aminocarboxylic acids (and their salts) represented by the generic structural formula:

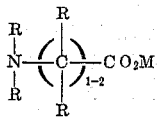

wherein M is one of the group consisting of hydrogen, ammonium bases, and metals, at least one of the R groups is an arvinylphenyl radical, and the other R groups are hydrogen or organic radicals including hydrocarbon groups such as alkyl groups, aryl groups, vinylaryl groups, aralkyl groups, or vinylaralkyl groups, carboxy groups, carboxyalkyl groups, carboxyalkylamino groups or carboxyalkylaminoalkyl groups. Particular subclasses of these new compounds are represented by the structural formulae:

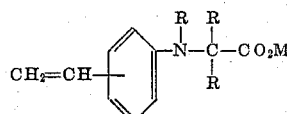

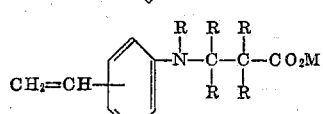

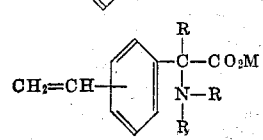

and

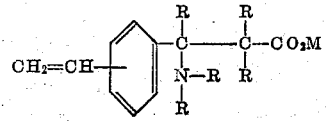

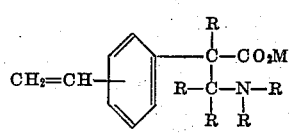

A still more specific subclass of these vinylphenyl aliphatic aminocarboxylic acids is represented by the structural formula:

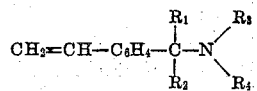

wherein the symbol $R_1$ represents a member of the group consisting of —H, —$CO_2M$, and —$CH_2CO_2M$; the symbol $R_2$ represents a member of the group consisting of —H and —$CH_3$; each of the symbols $R_3$ and $R_4$ individually represents a member of the group consisting of —H, —$CH_3$, —$CH_2$—$C_6H_4$—CH=$CH_2$, —$CH_2CO_2M$ —$CH_2CH_2$—$CO_2M$, —CH($CO_2M$)$CH_2CO_2M$
—$(CH_2)_2$—N($CH_2CO_2M$)$_2$
—$(CH_2)_3$—N($CH_2CO_2M$)$_2$ and

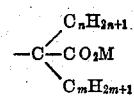

where $n$ is a whole number from 1 to 4 and $m$ is a whole number from 0 to 2; the symbol M represents a member of the group consisting of hydrogen, ammonium bases, and metals; and the other symbols have their usual meanings; and wherein at least one of the groups represented by the symbols $R_1$, $R_3$, and $R_4$ contains carboxyl group.

Within the the class of vinylphenyl aliphatic aminocarboxylic acids and salts having the generic structural formula just described there are the following types of compounds:

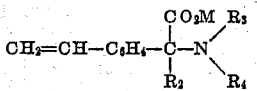

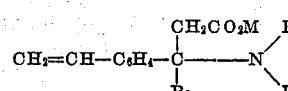

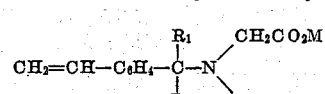

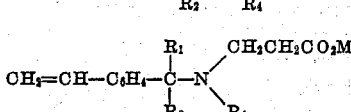

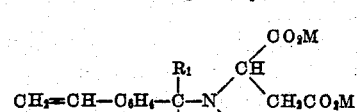

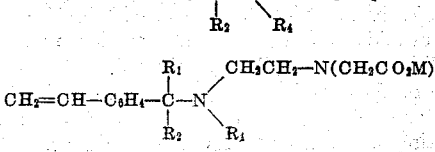

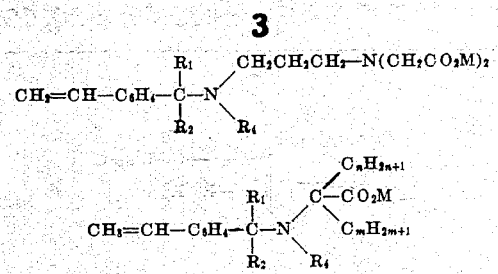

wherein the symbols have the meanings previously given.

The following specific compounds are illustrative of these vinylphenyl aliphatic aminocarboxylic acids:

N,N-bis(ar-vinylbenzyl)glycine
N-(ar-vinylbenzyl)sarcosine
N-(ar-vinylbenzyl)alanine
N,N-bis(ar-vinylbenzyl)alanine
N-(ar-vinylbenzyl)-β-alanine
N,N-bis(ar-vinylbenzyl)-β-alanine
N-(ar-vinylbenzyl)-2-aminobutyric acid
N-(ar-vinylbenzyl)-2-aminoisobutyric acid
N-(ar-vinylbenzyl)isovaline
N-(ar-vinylbenzyl) valine
N-(ar-vinylbenzyl)norvaline
N-(ar-vinylbenzyl)leucine
N-(ar-vinylbenzyl)isoleucine
N-(ar-vinylbenzyl)iminodiacetic acid
N-(ar-vinylbenzyl)-2-(vinylphenyl)glycine
N-carboxymethyl-N-(ar-vinylbenzyl)aspartic acid
2-(vinylphenyl)iminodiacetic acid
2-(vinylphenyl)nitrilotriacetic acid
N-carboxymethyl-N-(ar-vinylbenzyl)alanine
N-carboxymethyl-N-(ar-vinylbenzyl)-β-alanine
N-carboxymethyl-N-(ar-vinylbenzyl)-2-aminobutyric acid
N-carboxymethyl - N - (ar-vinylbenzyl) - 2 - aminoisobutyric acid
N-carboxymethyl-N-(ar-vinylbenzyl)isovaline
N-carboxymethyl-N-(ar-vinylbenzyl)valine
N-carboxymethyl-N-(ar-vinylbenzyl)norvaline
N-carboxymethyl-N-(ar-vinylbenzyl)leucine
N-carboxymethyl-N-(ar-vinylbenzyl)isoleucine
N-(ar-vinylbenzyl)aspartic acid
N,N-bis(ar-vinylbenzyl)aspartic acid
N-(ar-vinylbenzyl)-3,3'-iminodipropionic acid
2-(vinylphenyl)glycine
3-(vinylphenyl)-β-alanine
3-(vinylphenyl)-2-aminobutyric acid
N - carboxymethyl - N - (ar-vinylbenzyl) - 2 - (vinylphenyl)-glycine The following examples specifically illustrate the new vinylphenyl aliphatic aminocarboxylic acids, certain of their characteristics, and suitable ways by which they may be obtained, but are not to be construed as limiting the invention.

*Example 1.—Preparation of N-(ar-vinylbenzyl)-iminodiacetic acid*

Into a 5-liter round-bottom flask fitted with a mechanical stirrer, reflux condenser, and dropping funnel were placed 133 grams of iminodiacetic acid, 1 liter of water, 1.5 liters of methanol, and a solution of 66 grams of sodium hydroxide in 250 ml. of water. Stirring was begun, and the contents of the flask were heated to reflux. From the dropping funnel there was added to the reaction mixture 153 grams of ar-vinylbenzyl chloride over a period of one hour. After approximately one-fourth of the ar-vinylbenzyl chloride had been added, another portion of 66 grams of sodium hydroxide in 250 ml. of water was added all at once to the reaction mixture, and the addition of ar-vinylbenzyl chloride was continued. Heating of the reaction mixture was discontinued after completion of the addition of the ar-vinylbenzyl chloride, but stirring was continued for a further 30 minutes.

The methanol was distilled from the reaction mixture, and the cooled aqueous residue was four times extracted with 25-ml.-portions of chloroform. A small amount of decolorizing carbon was stirred into the aqueous solution and the mixture was filtered. The clear filtrate was heated to drive off traces of chloroform, and was cooled and acidified with concentrated hydrochloric acid to a pH value of 2. The white solid crystalline precipitate that formed was collected on a filter and dried. The crystalline product consisted substantially of N-(ar-vinylbenzyl)-iminodiacetic acid and sodium chloride. Recrystallization from water produced substantially pure N-(ar-vinylbenzyl)iminodiacetic acid having the analyses shown in Table I.

The acid dissociation constants of N-(ar-vinylbenzyl)-iminodiacetic acid were determined by titration as follows: Sufficient solid amino acid was dispersed in 200 ml. of 1 N KCl solution to make the solution approximately $10^{-3}$ M in respect to the amino acid. The solution was then potentiometrically titrated with standardized 0.1 N KOH solution. From these titration data, the acid dissociation constants were calculated.

First $H^+$: $k_1 = 5.14 \times 10^{-3}$
Second $H^+$: $k_2 = 2.40 \times 10^{-9}$

*Example 2.—Preparation of N,N-bis(ar-vinylbenzyl) glycine*

RUN 1

Into a 1-liter, 3-necked flask was charged 75.1 g. of glycine, 100 ml. of dioxane, and 300 ml. of water at 60° C. To the resulting mixture there were concurrently, separately, and slowly added 76.3 g. of ar-vinylbenzyl chloride and a solution of 77 ml. of 19.5 N sodium hydroxide solution in 75 ml. of water, the additions being made over a 45-minute period with continued stirring while the temperature of the reaction mixture was maintained at 70° C. The rate of addition of the sodium hydroxide solution was such as to maintain the pH value of the reaction mixture in the range from 8 to 10 during the course of the reaction.

After standing overnight at room temperature, the reaction mixture was extracted with chloroform. The chloroform extract was acidified with hydrochloric acid and diluted with water, whereupon a slurry of crystalline solid formed. The solid was collected on a filter, was washed with water and dried.

Analysis of the recrystallized N,N-bis(ar-vinylbenzyl)-glycine for ethylenic unsaturation using standardized bromate-bromide solution and glacial acetic acid as titration medium, was as shown in Table I.

RUN 2

In a manner analogous to that just described in Run 1, 150 g. of glycine was reacted with 152.6 g. of ar-vinylbenzyl chloride in 800 ml. of water as reaction medium, adding strong sodium hydroxide solution during the course of the reaction to maintain the pH of the reaction mixture at values between 8 and 10. Upon standing at room temperature, the reaction mixture formed two layers. These layers were separated, and each was extracted with ether and separately neutralized with hydrochloric acid, forming a crystalline precipitate in each instance. The solids were separately collected, washed and dried. There were thereby obtained 61.5 g. and 54 g. of N,N-bis(ar-vinylbenzyl)glycine from the lower and upper layers, respectively, of the reaction mixture. After recrystallization from hot 95 percent ethanol, the N,N-bis(ar-vinylbenzyl)glycine had the analyses shown in Table I.

The N,N-bis(ar-vinylbenzyl)glycine is not soluble per se in water. The amino acid was dissolved in an excess of alkali. Although the alkaline solution could be back-titrated with acid, rapid titration appeared to be a nonequilibrium process. An equilibrium titration was obtained by dissolving a test portion of the amino acid in a KCl solution containing an excess of standard KOH, adding a small amount of standard acid, closing the mixture in a container under an atmosphere of nitrogen free of carbon dioxide, tumbling the container at 30° C. until a steady pH value was obtained, adding a little more acid, and repeating the process until the titration curve was obtained. From these data, the dissociation constants for N,N-bis(ar-vinylbenzyl)glycine were found to be as follows:

$$k_1 = 2.27 \times 10^{-2}$$
$$k_2 = 1.67 \times 10^{-9}$$

*Example 3.—Preparation of N-(ar-vinylbenzyl)isovaline*

A mixture of 200 ml. of water, 50 ml. of dioxane and 47 g. of isovaline, together with a trace of hydroquinone, was heated to a temperature in the range from 55° to 60° C. in a stirred reaction vessel fitted with reflux condenser and dropping funnels. Over a period of one hour, there were concurrently added to the reaction mixture 15.3 g. of ar-vinylbenzyl chloride and 31.2 g. of sodium hydroxide.

After an additional hour of stirring, the reaction mixture was diluted with an equal volume of water and then was extracted with chloroform. The extracted water solution was acidified with hydrochloric acid to a pH value of 5.5, whereupon a white solid precipitate formed. The solid was collected, washed and dried to obtain 9.7 g. of N-(ar-vinylbenzyl)isovaline having the analyses shown in Table I.

*Example 4.—Preparation of N-(ar-vinylbenzyl)-2-(p-vinylphenyl)glycine*

A mixture of 2 g. of 2-(p-vinylphenyl)glycnie (from Example 8), 50 ml. of water and 10 mil. of dioxane was heated to 70° C. A total of 1.7 g. of ar-vinylbenzyl chloride was added in two portions about 15 minutes apart while the reaction mixture was stirred and the tempearture was maintained about 70° C. The pH value of the reaction mixture was maintained between 9 and 11 by adding 2 ml. of 50 percent by weight sodium hydroxide solution dropwise as needed over a one-hour period. After 4.5 hours of heating and stirring, the reaction mixture was cooled and filtered. The filtrate was extracted with ether and the aqueous layer was acidified with hydrochloric acid to a pH value of about 5. A precipitated pale yellow solid was collected and washed with water. The solid was redissolved in dilute aqueous alkali and reprecipitated with hydrochloric acid. The reprecipitated N-(ar-vinylbenzyl)-2-(p-vinylphenyl)glycine was collected, washed and dried. The analyses of the N-(ar-vinylbenzyl)-2-(p-vinylphenyl)glycine are shown in Table I.

*Example 5*

In the foregoing Examples 1–4, a number of vinylphenyl aliphatic aminocarboxylic acids were prepared by reaction of ar-vinylbenzyl chloride with aminocarboxylic acids having at least one hydrogen atom on the amino group. The ar-vinylbenzyl chloride employed in these examples was a mixture of isomers consisting essentially of from 60 to 65 percent by weight of p-vinylbenzyl chloride and from 40 to 35 percent of o-vinylbenzyl chloride. In place of this particular isomeric mixture, there can be used any of the individual isomers, i. e., o-vinylbenzyl chloride, m-vinylbenzyl chloride, or p-vinylbenzyl chloride, or mixture of two or more of such isomeric ar-vinylbenzyl chlorides to obtain the corresponding o-, m-, or p-vinylphenyl-substituted amino carboxylic acid or mixture thereof. In place of ar-vinylbenzyl chloride there can be used an ar-vinylbenzyl bromide with substantially the same results. In manner analogous to that shown in Examples 1–4, the following vinylphenyl aliphatic amino- carboxylic acids can be prepared by reaction in an alkaline aqueous medium of ar-vinylbenzyl chloride or ar-vinylbenzyl bromide and the amino acids as follows:

N-(ar-vinylbenzyl)sarcosine, from sarcosine;
N-(ar-vinylbenzyl)alanine, from alanine;
N,N-bis(ar-vinylbenzyl)alanine, from alanine;
N-(ar-vinylbenzyl)-β-alanine, from β-alanine;
N,N-bis(ar-vinylbenzyl)-β-alanine, from β-alanine;
N-(ar-vinylbenzyl)-2-aminobutyric acid from 2-aminobutyric acid;
N-(ar-vinylbenzyl)-2-aminoisobutyric acid from 2-aminoisobutyric acid;
N-(ar-vinylbenzyl)valine, from valine;
N-(ar-vinylbenzyl)norvaline, from norvaline;
N-(ar-vinylbenzyl)leucine, from leucine; and
N-(ar-vinylbenzyl)isoleucine, from isoleucine.

In carrying out these reactions, the amino acid and the ar-vinylbenzyl halide are dispersed in an aqueous medium that may also contain a further solubilizing agent such as dioxane or a lower alcohol. Sufficient alkali is added to the dispersion to maintain a neutral to alkaline reaction mixture, i. e. a pH value of at least 7, preferably in the range from 8 to 11. Suitable alkalies are the alkali metal hydroxides and carbonates such as sodium hydroxide, potassium hydroxide, sodium carbonate, and potassium carbonate. The reaction is accelerated by heating the reaction mixture and can conveniently be carried out at temperatures from room temperature to the boiling point of the reaction mixture. The amino acid product is usually obtained from the resulting reaction mixture by adjusting the pH value of the mixture to the isoelectric point of the amino acid, e. g. by addition to the aqueous reaction mixture of a strong acid such as hydrochloric acid, and collecting the precipitated aminocarboxylic acid.

*Example 6.—Preparation of N-(ar-vinylbenzyl)aspartic acid*

A solution of 34 g. of ar-vinylbenzylamine hydrochloride in 200 ml. of water was made alkaline by addition thereto of a solution of 9.6 g. of sodium hydroxide in 80 ml. of water. The liberated ar-vinylbenzylamine was extracted from the aqueous mixture with one 60–ml. and two 40-ml. portions of ether. After drying over anhydrous $Na_2SO_4$, the combined ether solutions were added to 68.8 g. of diethyl maleate. The resulting mixture was allowed to stand at room temperature for six days, after which 200 ml. of water and 16 ml. of concentrated hydrochloric acid were added with agitation. The ethereal layer was withdrawn and the aqueous layer was extracted with 20 ml. of ether. The aqueous layer was made strongly basic with 50 percent by weight sodium hydroxide, thereby precipitating an oil. The oil was extracted from the aqueous solution with two 20-ml. portions of ether. The ether extract was dried over anhydrous $Na_2SO_4$. Evaporation of the ether produced 49.1 g. of crude diethyl N-(ar-vinylbenzyl)-aspartate, $n_D^{24}=1.5144$. Other analyses are recorded in Table I, from which it can be deduced that the crude ester contained a small amount of polymer.

A mixture of 49.1 g. of the crude ester, 16.1 g. NaOH, and 150 ml. of water was heated under reflux for approximately three hours until the oily layer disappeared. The hydrolysis mixture was acidified to a pH value of approximately 2 by addition thereto of hydrochloric acid. The solid precipitate was collected, washed, and recrystallized from 70 ml. of boiling water. The recrystallized product was collected, washed and dried to obtain 30 g. of N-(ar-vinylbenzyl)aspartic acid which still contained some occluded sodium chloride. Analyses of the product are shown in Table I. From the titration of N-(ar-vinylbenzyl)aspartic acid at $10^{-3}$ M concentration of N/1 KCl solution with N/10 KOH solution, at 30° C., the acid dissociation constants were calculated as follows:

$$k_1 = 7.75 \times 10^{-4}$$
$$k_2 = 1.78 \times 10^{-9}$$

The ar-vinylbenzylamine employed in this Example 6 was a mixture of isomeric ar-vinylbenzylamines consisting essentially of from 60 to 65 percent by weight of p-vinylbenzylamine and from 40 to 35 percent of o-vinylbenzylamine. In place of this particular mixture of isomers, there can be used any of the individual isomers, i. e. o-vinylbenzylamine, m-vinylbenzylamine, p-vinylbenzylamine, or mixture of two or more of these isomeric ar-vinylbenzylamines, to obtain the corresponding o-, m-, or p-vinylbenzyl-substituted aminocarboxylic acid or mixture thereof.

Example 7

The preparation of N-(ar-vinylbenzyl)aspartic acid in Example 6 is representative of the preparation of a vinyl-phenyl aliphatic aminocarboxylic acid by reaction of an ar-vinylbenzylamine and an activated ethylenically unsaturated carboxylic-acid forming progenitor. In a similar manner, N,N-bis(ar-vinylbenzyl)amine can be reacted with diethyl maleate to form diethyl N,N-bis(ar-vinylbenzyl)aspartate, which can then be hydrolyzed to produce N,N-bis(ar-vinylbenzyl)aspartic acid.

Ar-vinylbenzylamine also adds to the ethylenic linkage of acrylonitrile. Accordingly, ar-vinylbenzylamine can be reacted with one mole of acrylonitrile to form 3-(ar-vinylbenzylamino)propionitrile which is then hydrolyzed to N-(ar-vinylbenzyl)-β-alanine. The addition of two moles of acrylonitrile to ar-vinylbenzylamine produces N-(ar-vinylbenzyl)-3,3'-iminodipropionitrile which is then hydrolyzed to N-(ar-vinylbenzyl)-3,3'-iminodipropionic acid. Similarly, the addition of N,N-bis(ar-vinylbenzyl)amine to acrylonitrile and hydrolysis of the 3-(N,N-bis(ar-vinylbenzyl)amino)propionitrile produces N,N-bis(ar-vinylbenzyl)-β-alanine.

Example 8.—Preparation of 2-(p-vinylphenyl)glycine

A solution of 132 g. of p-vinylbenzaldehyde in 250 ml. of methanol was added to a solution of 53.5 g. of ammonium chloride and 51.0 g. of sodium cyanide in 100 ml. of concentrated ammonium hydroxide and 200 ml. of water. To the reaction mixture was added approximately one gram of tert-butylcatechol and the reaction mixture was heated with intermittent stirring at approximately 50° C. for one hour. The resulting reaction mixture was diluted with an equal volume of water, and treated with a solution of 160 g. of sodium hydroxide in one liter of water and 250 ml. of methanol. The resulting mixture was heated at reflux for one hour, cooled, and extracted with 200 ml. of benzene. The benzene extract was in turn extracted with a small amount of 1 N sodium hydroxide solution. The sodium hydroxide extract was combined with the main aqueous reaction mixture and the combined mixture was acidified with dilute hydrochloric acid to a pH value of approximately 6. The yellow solid precipitate was collected, washed with water, and redissolved in dilute hydrochloric acid. After treatment with decolorizing carbon and filtration through filter aid, the clear acid solution was partially neutralized with sodium hydroxide solution to a pH value of approximately 6. The precipitated solid was collected, washed and dried to provide 37.9 g. of 2-(p-vinylphenyl)glycine, the analyses of which were as shown in Table I.

2-(vinylphenyl)glycine can also be made by reacting vinylbenzaldehyde with sodium cyanide and ammonium bicarbonate to form 5-(vinylphenyl)hydantoin, and hydrolyzing the latter.

Example 9.—Preparation of 3-(p-vinylphenyl)-β-alanine

To a solution of 12.6 g. of malonic acid in 6 g. of concentrated ammonium hydroxide were added 13.2 g. of p-vinylbenzaldehyde and 50 ml. of absolute alcohol. The resulting mixture was heated on a steam bath until the alcohol was evaporated and evolution of carbon dioxide ceased. The residue was dispersed in 200 ml. of water and an excess of hydrochloric acid was added to produce a granular precipitate that was collected. The filtrate was evaporated and extracted with ether. Evaporation of the ether produced a further quantity of solid product. Further concentration of the aqueous liquor gave another crop of solid product. The total yield of crude 3-(p-vinylphenyl)-β-alanine was approximately 10 g. The product was recrystallized from hot water. Analyses of the recrystallized product were shown in Table I.

In place of the p-vinylbenzaldehyde employed in the foregoing Examples 8 and 9, there can be employed another of the isomeric ar-vinylbenzaldehydes, i. e., m-vinylbenzaldehyde or o-vinylzenzaldehyde, or mixtures of two or more of such ar-vinylbenzaldehydes to obtain the corresponding o-, or m-vinylphenyl-substituted amino carboxylic acid, or mixture of ar-vinylphenyl-substituted amino carboxylic acids.

The condensation of malonic acid and ammonia with acetylstyrene can also be carried out to produce 3-(vinylphenyl)-3-aminobutyric acid.

Example 10.—Preparation of N-carboxymethyl-N-(ar-vinylbenzyl)-aspartic acid

A mixture of 12.5 g. N-(ar-vinylbenzyl)aspartic acid (from Example 6), 7.1 g. of chloroacetic acid, and 85 ml. of water was placed in a 250 ml. reaction flask. The mixture was made alkaline to a pH value of approximately 10 by addition thereto of 50 percent by weight aqueous sodium hydroxide, and the resulting mixture was heated to reflux for a period of 26 hours. During this time, concentrated aqueous sodium hydroxide solution was added as needed to maintain the pH value of the reaction mixture at approximately 10. When titration of a test sample for ionic chloride indicated substantially complete conversion of the chloroacetic acid, the reaction mixture was made strongly acidic (pH value of 2) with concentrated hydrochloric acid. N-carboxymethyl-N-(ar-vinylbenzyl)aspartic acid separated as a heavy grease from the aqueous salt solution and was converted to a solid product by tituration with acetone. Analyses of the N-carboxymethyl-N-(ar-vinylbenzyl)-aspartic acid are shown in Table I. The ionization constants for the tribasic carboxylic acid were determined by potentiometric titration with 0.1 N KOH of a $10^{-3}$ M solution of the amino acid in 200 ml. of 1 N KCl solution as follows:

$$k_1 = 5.2 \times 10^{-3}$$
$$k_2 = 1.17 \times 10^{-5}$$
$$k_3 = 8 \times 10^{-10}$$

Example 11.—Preparation of 2-(p-vinylphenyl)iminodiacetic acid and 2-(p-vinylphenyl)nitrilotriacetic acid To a mixture of 3 g. of 2-(p-vinylphenyl)glycine (from Example 8), 3 g. of sodium carbonate, and 25 ml. of water, were added a solution of 4.5 g. of sodium chloroacetate in 10 ml. of water and a trace of hydroquinone. The resulting mixture was heated at temperatures in the range from 70° to 80° C. for 8 hours, during which another 3 g. of sodium carbonate was added to the reaction mixture. After filtering the reaction mixture, the filtrate was acidified to a pH value of 2.5 with hydrochloric acid and was concentrated by evaporation in an air stream. The solid precipitate was collected, washed and dried. This product was a mixture of 2-(p-vinylphenyl)-iminodiacetic acid (condensation product of one molecular proportion of chloroacetic acid) and 2-(p-vinyl-phenyl)nitrilotriacetic acid (condensation product of two molecular proportions of chloroacetic acid). Recrystallization from hot water caused the separation of the mixture into two fractions, the least soluble product being substantially the 2-(p-vinylphenyl)iminodiacetic acid. The more soluble product was substantially the 2-(p-vinylphenyl)nitrilotriacetic acid. Analyses are shown in Table I.

*Example 12.—Preparation of N-(ar-vinylbenzyl)iminodiacetic acid*

To a solution containing 1.9 g. of chloroacetic acid, 1.6 g. of sodium hydroxide, 20 ml. of water and a trace of hydroquinone was added 1.7 of ar-vinylbenzylamine hydrochloride. The reaction mixture was heated for 30 minutes on a steam bath, treated with decolorizing charcoal and filtered. The filtrate was acidified to a pH value of 1.8 by addition thereto of hydrochloric acid, forming a white precipitate. After concentration to about 15 ml. by blowing with air, the slurry was filtered, and the white crystals of N-(ar-vinylbenzyl) iminodiacetic acid were washed with water and dried.

*Example 13*

Examples 10-12 are concerned with the preparation of N-carboxymethyl amino compounds by reactions involving chloroacetic acid. In similar manner, these and other amino acids can be made by reacting in an alkaline aqueous medium chloroacetic acid or bromoacetic acid and starting amino compounds that contain a vinylphenyl acid are dispersed in an aqueous medium. Sufficient alkali is added to the dispersion to maintain a neutral to alkaline reaction mixture, i. e. a pH value of at least 7, preferably in the range from 8 to 11. Suitable alkalies are the alkali metal hydroxides and carbonates such as sodium hydroxide, potassium hydroxide, sodium carbonate, and potassium carbonate. The reaction is accelerated by heating the reaction mixture and can conveniently be carried out at temperatures from room temperatures to the boiling point of the reaction mixture. The amino acid product is usually obtained from the resulting reaction mixture by adjusting the pH value of the mixture to the isoelectric point of the amino acid, e. g. by addition to the aqueous reaction mixture of a strong acid such as hydrochloric acid, and collecting the precipitated aminocarboxylic acid.

The vinylphenyl aliphatic aminocarboxylic acids illustrated by Examples 1-13 are in most instances solid, usually crystalline, products. In most instances they do not have sharp melting points but undergo decomposition when heated to elevated temperatures. They form salts of the carboxylic acid group by reaction with bases such as the ammonium bases, e. g. ammonia and organic amines, and with metal bases such as alkali metal and alkaline earth metal bases. Some of the metal base salts have chelate structures as shown in the succeeding example. These amino acids also form acid salts of the amino group, e. g. hydrochloride salts, at low pH values.

TABLE I

| Example | Sample Compound | Nitrogen, Weight Percent | | Neutral Equivalent[1] | | Ethylenic Unsaturation[2] | |
|---|---|---|---|---|---|---|---|
| | | Found | Calculated | Found | Calculated | Found | Calculated |
| 1 | N-(ar-vinylbenzyl)imino diacetic acid | 5.36 | 5.62 | 3.86 | 4.01 | 3.64 | 4.01 |
| 2 | {N,N-bis(ar-vinylbenzyl)glycine, Run 1 | | 4.56 | | 3.26 | 6.31 | 6.52 |
| | {N,N-bis(ar-vinylbenzyl)glycine, Run 2 | 4.33 | 4.56 | 3.38 | 3.26 | 6.28 | 6.52 |
| 3 | N-(ar-vinylbenzyl)isovaline | 5.87 | 6.39 | | 4.57 | 4.51 | 4.57 |
| 4 | N-(ar-vinylbenzyl)-2-(p-vinylphenyl)glycine | | 4.77 | 3.3 | 3.4 | 6.3 | 6.8 |
| 6 | {Diethyl N-(ar-vinylbenzyl)aspartate | 4.73 | 4.6 | 3.08 | 3.28 | 2.89 | 3.28 |
| | {N-(ar-vinylbenzyl)aspartic acid | | 5.61 | 3.66 | 4.01 | 3.62 | 4.01 |
| 8 | 2-(p-Vinylphenyl)glycine | 7.43 | 7.90 | 5.48 | 5.64 | 5.50 | 5.64 |
| 9 | 3-(p-Vinylphenyl)β-alanine | 7.56 | 7.33 | 5.24 | 5.24 | | 5.24 |
| 10 | N-carboxymethyl-N-(ar-vinylbenzyl)-aspartic acid | | 4.55 | 2.85 | 3.26 | | 3.26 |
| 11 | {2-(p-Vinylphenyl)iminodiacetic acid | 5.06 | 5.95 | 3.6 | 4.25 | 3.59 | 4.25 |
| | {2-(p-Vinylphenyl)nitrilotriacetic acid | 4.89 | 4.78 | 3.59 | 3.41 | 3.54 | 3.41 |

[1] Milliequivalents per gram of sample, standard acid-alkali titre, based on the amino group in the amino acid.
[2] Milliequivalents per gram of sample, bromate-bromide titre, using glacial acetic acid solvent.

group and at least one hydrogen atom on the amino group, for example:

N-carboxymethyl-N-(ar-vinylbenzyl)alanine, from N-(ar-vinylbenzyl)alanine (Example 5);
N-carboxymethyl-N-(ar-vinylbenzyl)-β-alanine, from N-(ar-vinylbenzyl)-β-alanine (Example 5);
N-carboxymethyl-N-(ar-vinylbenzyl)-2-aminobutric acid, from N-(ar-vinylbenzyl)-2-aminobutric acid (Example 5);
N-carboxymethyl-N-(ar-vinylbenzyl) - 2 - aminoisobutric acid, from N-(ar-vinylbenzyl)-2-aminoisobutyric acid, (Example 5);
N-carboxymethyl-N-(ar-vinylbenzyl)isovaline, from N-(ar-vinylbenzyl)isovaline (Example 5);
N-carboxymethyl-N-(ar-vinylbenzyl)valine, from N-(ar-vinylbenzyl)valine (Example 5);
N-carboxymethyl-N-(ar-vinylbenzyl)norvaline, from N-(ar-vinylbenzyl)norvaline (Example 5);
N-carboxymethyl-N-(ar-vinylbenzyl)leucine, from N-(ar-vinylbenzyl)leucine (Example 5);
N-carboxymethyl-N-(ar-vinylbenzyl)isoleucine, from N-(ar-vinylbenzyl)isoleucine (Example 5);
N-carboxymethyl-N-(ar-vinylbenzyl) - 2 - (vinylphenyl)-glycine, from N-(ar-vinylbenzyl)-2-(vinylphenyl)glycine (Example 4); and
N,N-bis(ar-vinylbenzyl)glycine, from bis - (ar - vinylbenzyl)-amine.

In carrying out these reactions, the vinylphenyl compounds that contain a —NH— group and the haloacetic

*Example 14*

The vinylphenyl aliphatic amino-carboxylic acids illustrated by the foregoing examples are characterized by the ability to chelate metal ions in solution. Therefore, these compounds are useful chelation agents. Some representative examples of these chelates were prepared and their properties are shown in Table II. In most instances, the metal chelates were prepared by dispersing the amino acid compound in water or in 1 N KCl solution, adding the metal ion in the form of its chloride salt, e. g.

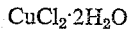

$CuCl_2 \cdot 2H_2O$ and titrating the resulting dispersion with alkali such as KOH solution. In some instances, the metal ions formed chelate structures with the amino acids at low pH values.

In Table II, and elsewhere throughout the examples, the chelate ratios are expressed in terms of the number of moles of amino acid ligand per atom of metal in the chelate complex. Studies of the chelates and determination of their stability constants were carried out substantially in accordance with the techniques described by Chaberek and Martell, J. Am. Chem. Soc. 74, 5052 (1952) and by J. Bjerrum, "Metal Ammine Formation in Aqueous Solution," pp. 2-38, published by P. Haase and Son, Copenhagen (1941).

In most instances the metal chelates are stable at neutral to alkaline pH values. At low pH values, most of the metal chelates are dissociated.

TABLE II

| Vinylphenyl Aliphatic Aminocarboxylic Acid | Metal Ion | Chelate | Chelate Stability Constants | | | Notes |
|---|---|---|---|---|---|---|
| | | | $K_1$ | $K_2$ | $K_3$ | |
| N-(ar-vinylbenzyl)iminodiacetic acid. | $Cu^{+2}$ | 1:1 and 2:1 | $3.48 \times 10^{10}$ | $7.94 \times 10^4$ | | 1, 2 |
| Do | $Co^{+2}$ | 1:1 and 2:1 | $6.38 \times 10^6$ | $5.13 \times 10^5$ | | 3, 6 |
| Do | $Ni^{+2}$ | 1:1 and 2:1 | $2.74 \times 10^7$ | $1.55 \times 10^6$ | | 2, 4 |
| Do | $Fe^{+3}$ | 1:1 and 2:1 and 3:1 | $2.82 \times 10^6$ | $1.18 \times 10^5$ | $4.16 \times 10^5$ | 2, 4, 5 |
| Do | $Fe^{+2}$ | 1:1 and 2:1 | $2.94 \times 10^5$ | $3.8 \times 10^4$ | | 10 |
| Do | $Pb^{+2}$ | 1:1 and 2:1 | $9.12 \times 10^5$ | $2.34 \times 10^3$ | | 6 |
| Do | $Mn^{+2}$ | 1:1 | $2.25 \times 10^6$ | | | 4, 6 |
| Do | $Mg^{+2}$ | | | | | |
| Do | $Ca^{+2}$ | | | | | 7, 12 |
| Do | $Ba^{+2}$ | | | | | |
| Do | $Sr^{+2}$ | | | | | |
| N,N-bis(ar-vinylbenzyl)glycine | $Cu^{+2}$ | 1:1 | $3.14 \times 10^6$ | | | 6, 11 |
| N-(ar-vinylbenzyl)-2-(p-vinylphenyl)glycine. | $Cu^{+2}$ | 2:1 | | | | 7 |
| N-(ar-vinylbenzyl)aspartic acid | $Cu^{+2}$ | 1:1 and 2:1 | $4.85 \times 10^7$ | $2.35 \times 10^6$ | | 1, 2 |
| N-carboxymethyl-N-(ar-vinylbenzyl)aspartic acid. | $Cu^{+2}$ | 1:1 and 2:1 | $6.73 \times 10^{11}$ | $1.06 \times 10^{10}$ | | 1, 2 |
| 3-(p-vinylphenyl)-β-alanine | $Cu^{+2}$ | 1:1 and 2:1 | | | | 7, 8 |
| 2-(p-vinylphenyl)nitrilotriacetic acid. | $Cu^{+2}$ | 1:1 and 2:1 | | | | 1, 2, 7, 9 |
| 2-(p-vinylphenyl)glycine | $Cu^{+2}$ | 1:1 and 2:1 | | | | 7, 8 |

(Notes to Table II)
1. Chelates soluble at all pH values.
2. 1:1 chelate formed at low pH values.
3. 1:1 chelate hydrolyzes at high pH values, but 2:1 chelate is soluble even at pH values over 10.
4. Chelates hydrolyze at high pH values.
5. Chelates precipitate at pH values between 5 and 8.
6. Chelates do not form at low pH with free acid but form with salts of the acid, e. g., the alkali metal salts.
7. Chelate stability constant not determined.
8. 2:1 chelate not soluble above pH 4.
9. At high pH values each molecule of the salt form of the acid is capable of chelating more than 1 metal ion.
10. Chelates soluble at pH values below 9.5.
11. Free acid, salts and chelates are only sparingly soluble in water.
12. Chelates formed from N-(ar-vinylbenzyl)iminodiacetic acid and alkaline earth metals were weak and the stability constants were not calculated.

When a solution containing N-(ar-vinylbenzyl)iminodiacetic acid and a cupric copper salt in which the molar concentration of the amino acid is greater than the molar concentration of the cupric salt is titrated with standardized alkali solution, there are observed two inflection points in the titration curve, i. e. a plot of pH value of the sample against the amount of added alkali. One of these inflection points occurs at a pH value of approximately 5 and corresponds to the neutralization of two protons liberated from the 1:1 chelate complex of the amino acid and cupric ion, plus one proton from the normal dissociation of one of the carboxyl groups of the non-complexed excess amino acid at low pH. The excess, non-complexed portion of the amino acid, after neutralization of one of its carboxyl groups, dissociates at its second carboxyl group, thereby liberating another proton, the neutralization of which corresponds to the second inflection point at a pH value of approximately 8.5. The difference in the amount of standard alkali which is used between the first and second "end points" (i. e. inflection points on the titration plot) is a measure of the amount of the amino acid that is in excess over the amount of cupric copper in the solution. If the total amount of amino acid initially present in the titration sample is precisely known, the titre by difference is a quantitative measure of the amount of cupric copper that is present, provided there are no other chelating metal ions also present.

The insoluble chelate of copper obtained with 3-(p-vinylphenyl)-β-alanine at an alkaline pH was analyzed:
Nitrogen, found, 5.81 percent by weight.
Nitrogen, calculated for

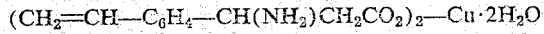

5.85 percent by weight.

At alkaline pH values, an insoluble blue chelate of cupric copper was also obtained with 2-(p-vinylphenyl)-glycine and was found to contain 6.28 percent by weight nitrogen. Nitrogen, calculated for

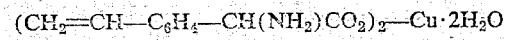

6.20 percent by weight.

The vinylphenyl aliphatic aminocarboxylic acids illustrated by the foregoing examples are characterized by the ability to polymerize. The individual vinylphenyl aliphatic aminocarboxylic acids can be polymerized to obtain homopolymers, and mixtures of the vinylphenyl aliphatic aminocarboxylic acids can be polymerized to obtain interpolymers. The polymerization can be carried out in mass, i. e. in the absence of diluents, or in solution, or in suspension in non-solvent media. The polymerizations are accelerated by heat, by activation with ionizing radiations, and by contact with catalysts such as $\alpha,\alpha'$-azobisisobutyronitrile and peroxygen compounds, e. g. persulfates and peroxides. In most instances, the polymers of vinylphenyl aliphatic aminocarboxylic acids that contain only one vinylphenyl group per monomer molecule are sparingly soluble in water and are more soluble in aqueous alkali. The polymers of vinylphenyl aliphatic aminocarboxylic acids that contain a plurality of vinylphenyl groups per monomer molecule are in most instances insoluble or only swellable by water. The polymers of these vinylphenyl aliphatic aminocarboxylic acids are capabe of chelating metal ions in a manner analogous to that of the corresponding monomeric materials.

The following examples illustrate the polymerization of some of these vinylphenyl aliphatic aminocarboxylic acids an dillustrate the use of the resulting resinous polymers as chelating agents for metal ions.

*Example 15.—Homopolymer of N-(ar-vinylbenzyl)iminodiacetic acid*

A solution of 23 grams of N-(ar-vinylbenzyl) iminodiacetic acid in 1300 mls. of water at a temperature of 90° C. was irradiated with ultraviolet light for three days. A pale yellow, fine powder, insoluble solid was separated from the solution in amount of approximately 11 grams. A further amount of solid was obtained by concentration and irradiation of the residual aqueous solution.

The insoluble solid was a homopolymer of N-(ar-vinylbenzyl)iminodiacetic acid. Potentiometric titrations of the polymer were carried out in closed titration cells, with agitation and under an atmosphere of nitrogen free of carbon dioxide, the pH of the sample being measured by means of a glasscalomel electrode system. The titrations were carried out by adding acid or base solutions in small increments and allowing equilibrium to be attained in each instance before adding the next increment of reagent.

From data obtained by so titrating a sample of polymeric N-(ar-vinylbenzyl)iminodiacetic acid, dispersed to a concentration of $1.831 \times 10^{-3}$ molar in a 1 N KCl solution, at 30° C., with standardized N/10 KOH solution, the acid dissociation constants for the polymer were calculated on the assumption of a homogeneous, single phase system, and were found to be as follows:

$$k_1 = 4.24 \times 10^{-4}$$
$$k_2 = 5.58 \times 10^{-10}$$

These values are somewhat lower than the corresponding values for the monomeric material.

Addition of cupric ions, e. g. as $CuCl_2 \cdot 2H_2O$, to a water dispersion of the polymeric N-(ar-vinylbenzyl) iminodiacetic acid caused the resin to turn blue, while the water phase remained colorless.

From a titration of the resin in the presence of cupric ions in the manner described above in this example, the polymeric N-(ar-vinylbenzyl)iminodiacetic acid was found to form both 1:1 and 2:1 chelates (moles of resin:metal ion) with cupric ions, having chelate stability constants, calculated on the assumption of a homogeneous, single phase system, as follows:

$$K_1 = 5.62 \times 10^9$$
$$K_2 = 1.38 \times 10^6$$

Addition of ferric ions, e. g. as $FeCl_3$, to the water dispersion of the polymeric N-(ar-vinylbenzyl)iminodiacetic acid caused formation ow a 1:1 chelate. Upon addition of alkali, 2:1 and 3:1 chelates (moles of resin: ferric ion) were formed, hydrolysis occurring above a pH value of 8.5. The stability constants for these chelates were found to be as follows:

$$K_1 = 1.20 \times 10^{10}$$
$$K_2 = 4.46 \times 10^7$$
$$K_3 = 7.94 \times 10^4$$

Polymeric N-(ar-vinylbenzyl)iminodiacetic acid forms stable chelates with iron and was used to remove iron ions from water solution, either by stirring the resin into, and filtering the resin chelate from, iron-containing aqueous solutions, or by passing such iron-containing liquids through a layer of the resin.

*Example 16.—Homopolymer of N,N-bis(ar-vinylbenzyl)-glycine*

A mixture of 17.8 g. of N,N-bis(ar-vinylbenzyl)glycine and 50 ml. of 1 N NaOH solution was heated to reflux and 14.4 mg. of sodium persulfate was added. After two hours, another 14.4 mg. of sodium persulfate was added and refluxing was continued. After 18 hours, 100 mg. of sodium persulfate and 150 ml. of water were added. After 48 hours the gelled product was diluted with one liter of water. Water was separated from the gel, and the gel was dispersed in one liter of dilute sodium hydroxide. The dispersion was heated, and filtered; the gel was thoroughly washed with water and dried under vacuum to obtain 16.5 g. of brittle yellow resinous polymer of N,N-bis(ar-vinyylbenzyl)glycine.

Acid-base titrations of 0.1018 g. of the polymer dispersed in 200 ml. of 1 N KCl solution were carried out under a $CO_2$-free nitrogen atmosphere using the equilibrium method of incremental addition of reagents as described in Example 15. Similar titrations after addition of 0.0282 g. $CuCl_2 \cdot 2H_2O$ showed that the polymer formed 1:1 and 2:1 chelates with copper, the stability constants being as follows:

$$K_1 = 2.22 \times 10^5$$
$$K_2 = 4.20 \times 10^4$$

*Example 17.—Homopolymer of 2-(p-vinylphenyl)nitrilo-triacetic acid*

An alkaline (sodium hydroxide) solution of 2-(p-vinylphenyl)nitrilotriacetic acid, sodium salt (20 percent by weight), and $\alpha,\alpha'$-azobisisobutyronitrile (0.2 percent by weight) was heated at 70° C. for four days to obtain polymerized 2-(p-vinylphenyl)nitrilotriacetic acid. The polymer formed stable chelates with copper and like metal ions.

The polymeric forms of the vinylphenyl aliphatic aminocarboxylic acids are solid, resinous products which, like the corresponding monomeric forms, are capable of forming salts of the carboxylic acid group by reaction with ammonium bases, such as ammonia and organic amines, and with metal bases, such as alkali metal and alkaline earth metal bases. Some of the metal salts, as shown in the foregoing examples, have chelate structures. In most instances, these chelates are stable at neutral to alkaline pH values, but are dissociated at low pH values. Therefore, the amino acids can be regenerated from their chelate salt forms by treatment thereof with strong acid such as hydrochloric acid.

The products of this invention possess useful and advantageous properties as chelating and sequestering agents for metal ions. Although all of the products of this invention possess these common properties, they do not necessarily possess such properties to the same degree. Individual products of this invention can readily be distinguished from other individual products and are particularly adapted to specific uses. They have application in some instances in solubilizing metals in compositions from which insoluble metal compounds would otherwise precipitate. In other instances they effect the precipitation of metals from compositions in which the metal would otherwise be soluble. Accordingly, these products are used to supply metals to compositions that are otherwise intolerant of such metals, and to inactivate or even to remove metal ions from compositions in which the presence of active metal ions is unwanted. These products are unique in that they are also polymerizable and therefore have further advantage and utility in being capable of forming polymeric materials having chelating function. Therefore, the products of this invention are advantageously employed in industry and commerce.

For purpose of specific illustration of the use of the resinous polymeric forms of these vinylphenyl aliphatic aminocarboxylic acids, the following tests were carried out. An intimate mechanical mixture was prepared comprising two parts by weight of small pieces of polystyrene resin foam and one part by weight of the homopolymeric N-(ar-vinylbenzyl)iminodiacetic acid obtained in Example 15. This mixture was placed in a glass tube 15 mm. in diameter and two feet long to provide a fluid-permeable solid resin bed. One hundred milliliters of a $5 \times 10^{-3}$ M aqueous solution of ferric chloride was slowly passed into the resin bed. Ferric ions were removed from the solution during passage through the bed and were retained by the resin. After rinsing the resin bed with water, the iron-containing resin was regenerated to the acid form by elution with 1 N HCl solution, ferric chloride being removed in the effluent.

In another test 0.1085 g. of the homopolymeric N-(ar-vinylbenzyl)iminodiacetic acid obtained in Example 15 was dispersed by stirring into 200 ml. of aqueous solution that was 1 N in respect to KCl and $1.0155 \times 10^{-3}$ M in respect to cupric chloride. The resin particles turned blue in color while the aqueous solution became colorless. The resin particles were separated by filtration to yield a filtered solution that was substantially free of copper ions. The copper-containing resin particles were regenerated by washing with 1 N HCl solution.

We claim:
1. A polymerizable vinylphenyl aliphatic aminocarboxylic compound having the formula

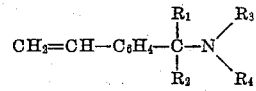

wherein the symbol $R_1$ represents a radical selected from the group consisting of —H, —CO$_2$M, and —CH$_2$CO$_2$M, the symbol R$_2$ represents a radical selected from the group consisting of —H and —CH$_3$, each of the symbols R$_3$ and R$_4$ individually represents a radical selected from the group consisting of —H, —CH$_3$,

—CH$_2$—C$_6$H$_4$—CH=CH$_2$, —CH$_2$CO$_2$M,

—CH$_2$CH$_2$CO$_2$M, —CH(CO$_2$M)CH$_2$CO$_2$M,

—CH$_2$CH$_2$—N(CH$_2$CO$_2$M)$_2$,

—CH$_2$CH$_2$CH$_2$—N(CH$_2$CO$_2$M)$_2$, and $$\begin{array}{c} C_nH_{2n+1} \\ | \\ -C-CO_2M \\ | \\ C_mH_{2m+1} \end{array}$$

where $n$ is an integer from 1 to 4 and $m$ is an integer from 0 to 2, M is a member of the group consisting of hydrogen, ammonium bases and metals, and wherein at least one of the radicals represented by the symbols R$_1$, R$_3$, and R$_4$ contains a carboxyl group.

2. A compound having the formula

CH$_2$=CH—C$_6$H$_4$—CH$_2$—N(CH$_2$CO$_2$M)$_2$ where M is a member of the group consisting of hydrogen, ammonium bases, and metals.

3. A compound having the formula

CH$_2$=CH—C$_6$H$_4$—CH$_2$—NH—CH(CO$_2$M)CH$_2$CO$_2$M where M is a member of the group consisting of hydrogen, ammonium bases, and metals.

4. A compound having the formula

CH$_2$=CH—C$_6$H$_4$—CH(NH$_2$)CO$_2$M where M is a member of the group consisting of hydrogen, ammonium bases, and metals.

5. A compound having the formula

CH$_2$=CH—C$_6$H$_4$—CH(CO$_2$M)N(CH$_2$CO$_2$M)$_2$ where M is a member of the group consisting of hydrogen, ammonium bases, and metals.

6. A compound having the formula (CH$_2$=CH—C$_6$H$_4$—CH$_2$—)$_2$NCH$_2$CO$_2$M where M is a member of the group consisting of hydrogen, ammonium bases, and metals.

7. A method of making a vinylphenyl aliphatic aminocarboxylic compound of the class claimed in claim 1 which comprises interacting an aliphatic aminocarboxylic compound, wherein the amino group has at least one hydrogen atom and is in one of the positions α and β relative to the carboxylic group, with an ar-vinylbenzyl halide in the presence of aqueous alkali.

8. A method of making a vinylphenyl aliphatic aminocarboxylic compound of the class claimed in claim 1, which comprises interacting an ar-vinylbenzylamino compound having at least one amino hydrogen atom with an ethylenically unsaturated compound of the group consisting of diethyl maleate and acrylonitrile and hydrolyzing the resulting reaction product.

9. A method of making a vinylphenyl aliphatic aminocarboxylic compound of the class claimed in claim 1 which comprises interacting a monohaloacetic acid and an ar-vinylbenzylamino compound having at least one amino hydrogen atom in the presence of aqueous alkali.

10. A method of making a N-(ar-vinylbenzyl)iminodiacetic acid which comprises interacting iminodiacetic acid and an ar-vinylbenzyl chloride in the presence of aqueous alkali.

11. A method of making a N-(ar-vinylbenzyl)aspartic acid which comprises interacting diethyl maleate and an ar-vinylbenzyl amine and hydrolyzing the resulting reaction product.

12. A method of making a 2-(ar-vinylphenyl)glycine which comprises interacting an ar-vinylbenzaldehyde, an alkali cyanide, and ammonia in an alkaline aqueous reaction mixture.

13. A method of making a 2-(ar-vinylphenyl)-nitrilotriacetic acid which comprises interacting a 2-(ar-vinylphenyl)glycine with at least two molecular proportions of an alkali chloroacetate in an alkaline aqueous reaction mixture.

14. A method of making an N,N-bis(ar-vinylbenzyl)-glycine which comprises interacting an ar-vinylbenzyl chloride and glycine in an alkaline aqueous reaction mixture.

References Cited in the file of this patent
UNITED STATES PATENTS

| | | |
|---|---|---|
| 675,217 | Homolka | May 28, 1901 |
| 2,200,220 | Reppe et al. | May 7, 1940 |
| 2,612,521 | MacDonald | Sept. 30, 1952 |

FOREIGN PATENTS

| | | |
|---|---|---|
| 479,228 | Germany | July 20, 1929 |
| 1,045,800 | France | July 1, 1953 |
| 1,109,586 | France | Sept. 28, 1955 |